(12) United States Patent
Scheffler

(10) Patent No.: US 6,847,410 B1
(45) Date of Patent: Jan. 25, 2005

(54) PICTURE DATA MEMORY DEVICE WITH PICTURE DATA INPUT CHANNELS AND PICTURE DATA OUTPUT CHANNELS

(75) Inventor: Guenter Scheffler, München (DE)

(73) Assignee: Infineon Technologies AG, Munich (DE)

( * ) Notice: Subject to any disclaimer, the term of this patent is extended or adjusted under 35 U.S.C. 154(b) by 497 days.

(21) Appl. No.: 10/018,906

(22) PCT Filed: Jun. 19, 2000

(86) PCT No.: PCT/DE00/02011

§ 371 (c)(1),
(2), (4) Date: Dec. 18, 2001

(87) PCT Pub. No.: WO00/79793

PCT Pub. Date: Dec. 28, 2000

(30) Foreign Application Priority Data

Jun. 21, 1999 (DE) ........................ 199 28 258

(51) Int. Cl.[7] ............................................... H04N 9/64
(52) U.S. Cl. ...................................... 348/714; 348/718
(58) Field of Search ................................ 348/714, 715, 348/716, 718, 719, 565; 382/305; 345/530–574; H04N 9/64, 5/45

(56) References Cited

U.S. PATENT DOCUMENTS

| | | | | |
|---|---|---|---|---|
| 4,485,402 A | * | 11/1984 | Searby | 348/715 |
| 5,731,852 A | | 3/1998 | Lee | 348/719 |
| 5,854,635 A | | 12/1998 | Wakamatsu | 345/507 |
| 6,559,895 B1 | * | 5/2003 | Dosho et al. | 348/714 |
| 6,674,920 B1 | * | 1/2004 | Ishikawa | 382/305 |

FOREIGN PATENT DOCUMENTS

EP    0 594 241 A1    4/1994

OTHER PUBLICATIONS

English Translation of PCT International Preliminary Examination Report, dated Jul. 5, 2001, 7 pgs.

* cited by examiner

Primary Examiner—Sherrie Hsia
(74) Attorney, Agent, or Firm—Peter F. Corless; Steven M. Jensen; Edwards & Angell, LLP

(57) ABSTRACT

A picture data memory device which can be used universally comprises a central picture data memory for storing picture data of a plurality of picture data input channels, in which case the stored picture data can additionally be read out via a plurality of picture data output channels for different kinds of further processing. A memory controller is provided for coordinating the individual storage operations of the picture data input channels and the individual rend-out operations of the picture data output channels.

17 Claims, 3 Drawing Sheets

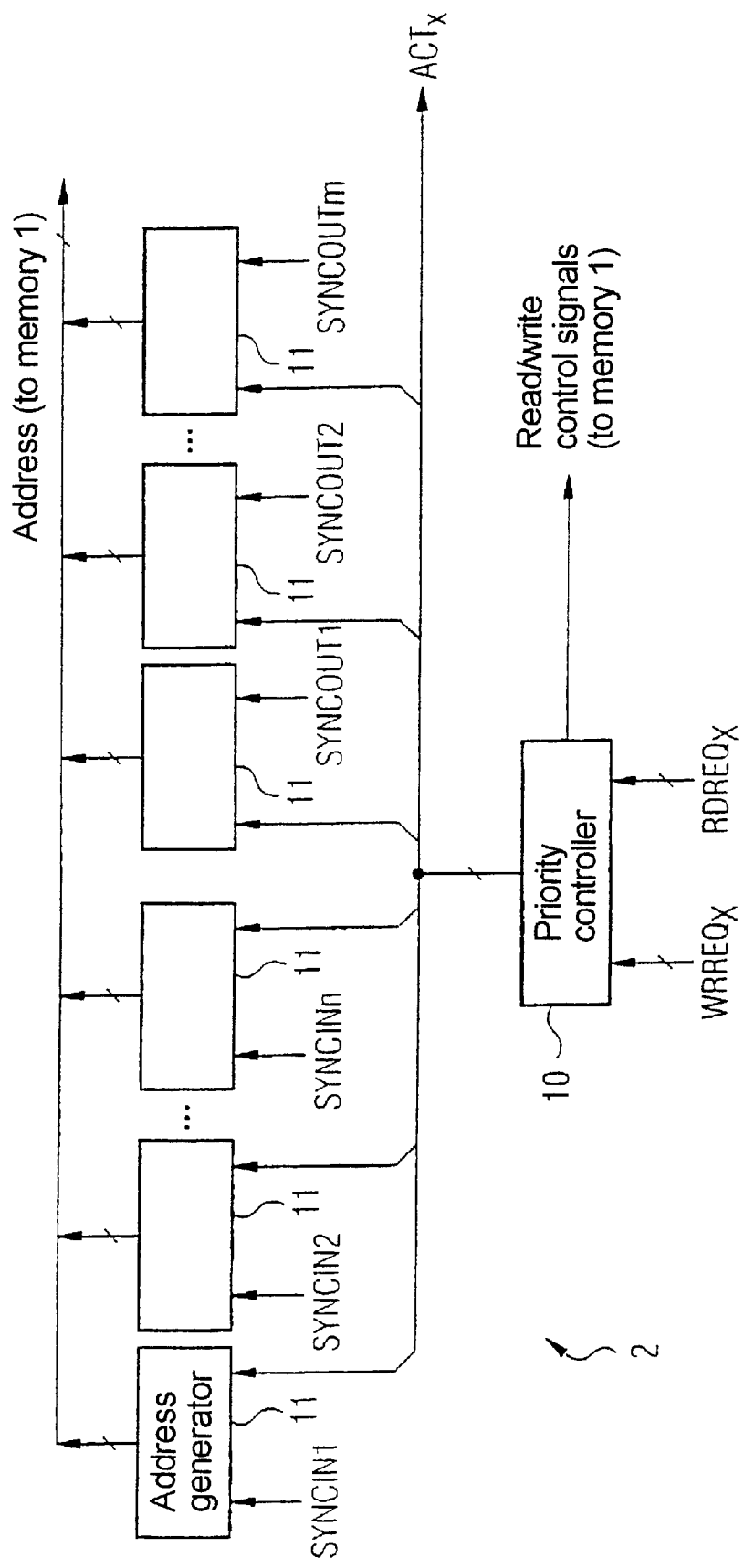

PICTURE DATA MEMORY DEVICE WITH PICTURE DATA INPUT CHANNELS AND PICTURE DATA OUTPUT CHANNELS

BACKGROUND OF THE INVENTION

The present invention relates to a picture data memory device which can be used universally.

Picture memories are increasingly being used in video signal processing in order to be able to implement complex picture processing algorithms, such as e.g. 100 Hz conversion, motion vector estimation or MPEG processing (Moving Pictures Experts Group). For this purpose, it is conventional practice for separate picture memory modules with separate controllers and separate memory paths to be provided for the individual picture processing algorithms. However, it is often the case that picture data of a multiplicity of mutually asynchronous picture data channels are present simultaneously (for example in Picture-In-Picture (PIP) Applications), with the result that in this case, when using the conventional technology, a correspondingly high outlay on hardware is required in order to be able to store and process the picture data of all the picture data channels.

SUMMARY OF THE INVENTION

The present invention is therefore based on the object of providing a picture data memory device which can be used universally and which enables the storage and read-out of picture data of different input channels or picture data sources.

This object is achieved by means of a picture data memory device, according to preferred and advantageous embodiments of the present invention.

The present invention relates to a picture data memory device having a central picture data memory for storing data of a plurality of picture data input channels connected to the picture data memory, the central picture data memory additionally being connected to a plurality of picture data output channels for reading out and outputting stored picture data for different types of further processing of the picture data read out. The central picture data memory is assigned a memory controller which coordinates the individual storage and read-out operations, thereby enabling all the required storage operations, i.e. the writing of picture data of different input channels and the read-out of any desired picture data via different output channels. The high memory bandwidth of memory modules that are available nowadays is utilized for this purpose. All the input and output channels may be asynchronous. This relates both to the synchronization signals assigned to each picture data channel and to the associated sampling clock signals, with regard to their frequency and phase.

The configuration of the picture data memory device according to the invention takes account of the fact that, both at the input and at the output, continuous picture data streams have to be written and/or read.

For this purpose, corresponding measures are proposed in the input and output channels of the picture data memory device.

The individual storage and read-out operations are preferably processed by the memory controller in accordance with a specific priority scheme. All the input and output channels can be connected to the central picture data memory via a common memory bus, picture data being transferred from the input channels to the central picture data memory, or from the central picture data memory to the output channels via the memory bus. The memory controller accesses the central picture data memory for addressing and control purposes.

The central picture data memory used may be inexpensive standard memories, such as e.g. SDRAMs or eDRAMs (embedded DRAMs). The picture data memory device according to the invention represents an outlay-optimized system for all the memories required in the system and can easily be configured by adding or omitting individual input or output channels. Smaller memory units, such as e.g. line memories, can easily be implemented by adding a further channel.

Each input or output channel is advantageously assigned control or activation signals which enable the picture data memory device to be easily addressed by corresponding peripheral processing blocks.

Since asynchronous input and output channels can advantageously be supported according to the invention, complex picture processing algorithms, such as e.g. so-called universal scan rate conversion (SRC) with conversion from the "50 Hz interlaced" mode into the "60 Hz progressive" mode, can be realized more easily. Moreover, synchronization of asynchronous picture sources or input channels is possible in a very simple manner, this being required, for example, in particular in the case of the simultaneous representation of a plurality of moving picture (multi-PIP representation).

The invention is explained in more detail below using preferred embodiments with reference to the accompanying drawing.

BRIEF DESCRIPTION OF THE DRAWINGS

FIG. 3 shows the construction of the memory controller shown in FIG. 1 in accordance with a further preferred exemplary embodiment of the present invention.

DETAILED DESCRIPTION OF THE INVENTION

Figure 1:
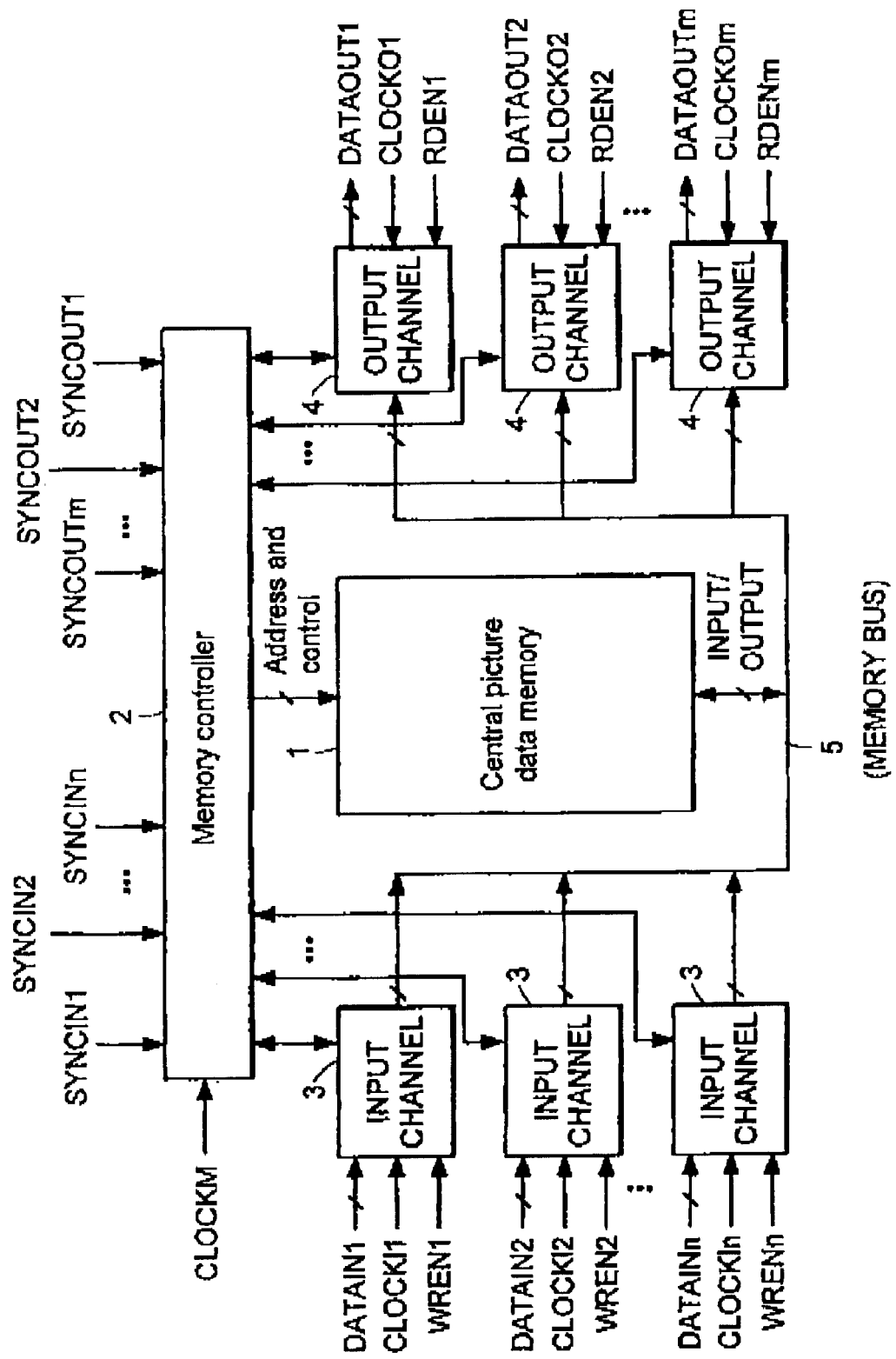
FIG. 1 shows a schematic block diagram of the basic construction of a picture data memory device according to the invention.

As is indicated in FIG. 1, the picture data memory device according to the invention comprises a central picture data memory 1, which is addressed by a corresponding memory controller 2. A plurality of input channels 3 and a plurality of output channels 4 are connected to the central picture data memory 1 preferably via a common memory bus 5, with the result that picture data of different sources can be written to the picture data memory 1 and picture data can be read out and output from the picture data memory 3 for different applications or types of processing. All the input and output channels can be asynchronous with respect to one another, i.e. the individual channels 3 and 4 can be assigned synchronization signals SYNCIN and/or SYNCOUT and clock signals CLOCKI/CLOCKO that are asynchronous with regard to their frequency and/or phase.

The central picture data memory 1 may comprise for example one or more SDRAM memory modules. Equally, it may be constructed from so-called embedded DRAM or eDRAM memory modules, this solution being particularly advantageous since, on the one hand, the storage capacity and, on the other hand, at the same time the memory bandwidth can easily be adapted to the respective requirements, the storage capacity being adapted through the number of memory modules used and the memory bandwidth being adapted by variation of the width of the data bus 5.

In the configuration of the picture data memory device shown in FIG. 1, it must be taken into account that, both at the input and at the output of the picture data memory device, continuous picture data streams DATAIN/DATAOUT have to be written and/or read. In contrast to a computer memory, for example, a picture data stream, during real-time picture processing, cannot arbitrarily be halted if a capacity bottleneck occurs at a point in the system, since, during real-time picture processing, immediate representation of the processed pictures on a screen or monitor must be possible. For this purpose, the memory bandwidth at the inputs and outputs must also be large enough that each input 3 and output 4 can be continuously served even in the case of a maximum possible data transfer from and to the picture data memory 1.

As has already been mentioned, each input channel 3 is assigned a picture data stream DATAIN, a clock signal CLOCKI, a synchronization signal SYNCIN marking the picture and line start, and a write activation signal WREN, which identifies picture data that are to be written in in a valid manner. Correspondingly, each output channel 4 is assigned a picture data stream DATAOUT, a clock signal CLOCKO, a synchronization signal SYNCOUT and a read activation signal RDEN, with which the desired data can be requested by the downstream blocks. The writing and read-out of picture data are effected via the common memory or picture data bus 5, the memory controller 2 accessing the central picture data memory 1 in order to address and drive the latter. For addressing purposes, each input and output channel 3 and 4, respectively, is preferably assigned an arbitrary address range in the picture data memory 1 to and from which picture data can be written and read, respectively. This channel-specific address range is traversed by an address generator of the memory controller 2 generally beginning with a start address linearly through to a maximum address. As is shown in FIG. 3, in the most general case a dedicated address generator 11 is allocated to each channel 3 or 4 for this purpose.

The sequence of the addresses generated by the individual address generators 11 can be manipulated as desired by the definition of additional control signals and parameters of the memory controller 2, with the result that it is possible, for example, only to write to or read from a part of the memory area of the picture data memory 1, in order e.g. to "stamp" a size-reduced picture into a main picture or to read out only part of the whole picture. This can be realized for example by the variable parameters "position within a line", "number of pixels", and "number of lines" being defined for the memory controller. During read-out, this process of skipping one or more lines or alternatively the repetition of one or more lines is necessary for different picture processing algorithms. For this purpose, it is possible to define a respective control signal which is to be applied to the memory controller and causes the address at the start of the line to be correspondingly advanced or repeated.

The synchronization signals SYNCIN or SYNCOUT respectively assigned to each input and output channel are fed to the memory controller 2, or the individual address generators 11, in order to set the associated address generator 11 to a defined start address at the start of a written or read picture or of a picture line.

In addition to generation of the memory addresses and control signals for the central picture data memory 1, a further essential task of the memory controller 2 is to coordinate all memory accesses of the input and output channels 3 and 4, respectively. This task is performed by the priority controller 10 shown in FIG. 3, which collects all the write request signals WREQ of the input channels 3 and read request signals RDREQ of the output channels 4 and enters them according to specific criteria into a list or queue which specifies the order in which they will be processed. This list is updated with each newly arriving request signal and each processed request. The priority scheme followed by the priority controller 10 may be, for example, such that a channel operating at a high clock frequency is allocated a high priority and a channel operating at a low clock frequency is allocated a low priority.

As soon as a request of an input or output channel appears at the topmost position in the above-mentioned processing list, the priority controller 10 generates an activation signal ACT and transmits it to the corresponding channel in order to initiate the data transfer associated with the request to be processed. In this way, this channel is allocated a time slot for the data transfer. Furthermore, the address generator 11 of this channel generates an address for access to the picture data memory 1 and generates the required control signals for the memory access. The activation signal ACT can simultaneously be used for incrementing to the address. After the end of a memory access, the priority controller 10 of the memory controller 2 immediately initiates the next data transfer by generating the activation signal ACT for the channel which is now in first place in the processing list. Consequently, all the memory accesses are strung together in an uninterrupted manner, and the available memory bandwidth is utilized optimally.

In order to utilize the data rate of the picture data memory 2 as well as possible, preferably a plurality of successive addresses are written or read during, a access (so-called page mode). For this purpose, a buffer memory is required in each input channel 3 and output channel 4. The construction of an input channel 3 is illustrated in FIG. 2A, while the construction of an output channel 4 is illustrated in FIG. 2B.

Figure 2:
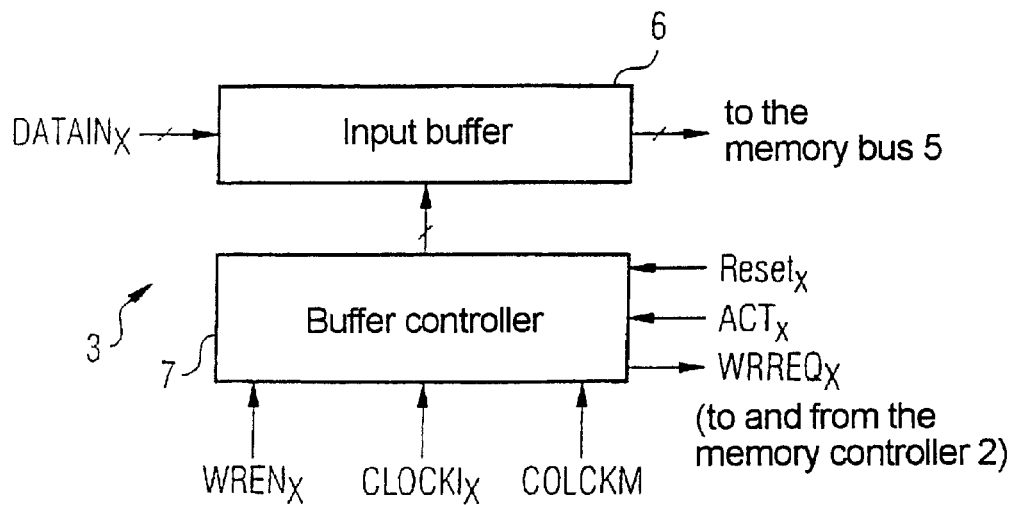
FIGS. 2A and 2B show the construction of an input channel and output channel, respectively, shown in FIG. 1 in accordance with a preferred exemplary embodiment of the present invention.
Figure 2:
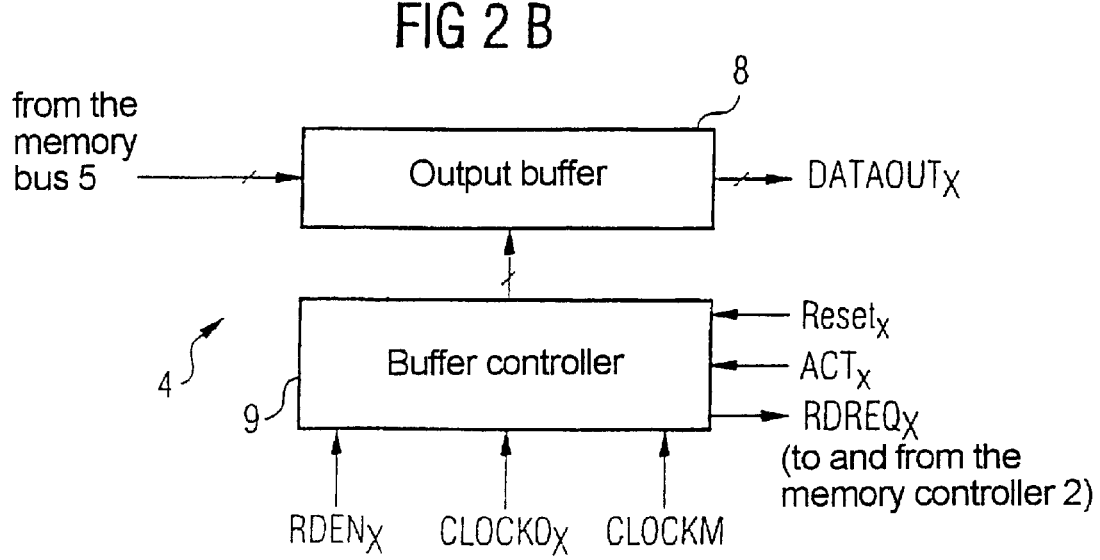

As can be gathered from the illustration of FIG. 2A, each input channel 3 contains an input buffer 6, to which the corresponding picture data DATAIN are fed continuously. The incoming picture data are collected in the input buffer 6 until there are enough picture data to be able to carry out a memory transfer. Once this state of occupancy has been reached, a corresponding buffer controller 7 generates a write request WRREQ, which is entered into the processing list by the priority controller 10 shown in FIG. 3, and processed. Conversely, a reset signal Reset can be fed to the buffer controller at any time by the memory controller 2.

Each output channel 4 also contains a buffer memory 8 and a buffer controller 9. The picture data associated with a read operation and read from the picture data memory 1 are buffer-stored in the output buffer 8 and slowly read out in order to ensure a continuous output data stream DATAOUT. Once the output buffer 8 has been emptied to such an extent that new picture data can again be received from the main memory 1, the associated buffer controller 9 generates a corresponding read request RDREQ and communicates it to the memory controller 2 or the priority controller 10 contained therein.

The capacity of the buffer memories 6 and 8 must in each case be greater than that volume of data which is transferred during a data transfer, since generally neither a write request WRREQ nor a read request RDREQ can be fulfilled immediately. Therefore, each input channel 3 or input buffer 6 must be able to buffer-store the incoming picture data during this waiting time. Conversely, each output channel 4 or output buffer 8 must also be able to provide picture data during this waiting time in order to ensure an uninterrupted picture data stream toward the outside.

In addition to the tasks described above, the buffer memories 6 and 8 also convert the word width, in order to adapt the word width of the input channel 3 or of the output channel 4 to that of the memory bus 5. If the word width of the input channel 3 is 8 bits, for example, then that of the memory bus 5 is 64 bits, for example, eight samples are combined to form a 64-bit word which, proceeding from the buffer memory 6, is transferred to the central picture data memory 1 via the memory bus 5. The adaptation is performed correspondingly the other way round in the output channel 4.

In the buffer memories 6 and 8, in each case two different clock systems meet. The central picture data memory 1 operates with the memory clock signal CLOCKM. The input buffers 6 are therefore written to with the channel-specific clock signal CLOCKI and read from with CLOCKM, while the output buffers 8 are written to with CLOCKM and read from with CLOCKO. Such buffers or buffer memories can be realized for example with register chains or SRAM modules. The individual clock signals CLOCKI, CLOCKM and CLOCKO can have different frequencies and phase angles.

As has already been mentioned, the memory controller 2 defines the order in which requests of the input and output channels are processed, in accordance with predetermined priorities. On the other hand, the memory controller 2 must also take care to ensure that each channel 3 or 4 is served within an individually defined period of time, in order that the picture data flow is not interrupted in an impermissible manner. This period of time depends on the clock rate and on the size of the buffer memory 6 or 8 respectively assigned to each channel 3 or 4. Generally, the entire picture data memory device should be dimensioned in such a way as to ensure that all the write or read requests are always fulfilled in good time, in order that the desired pixel or picture data sequence is ensured on all channels 3 or 4. To that end, the data rates of the all the channels must be added and brought into accord with the achievable data rate of the central picture data memory 1 taking account of all the instances of addressing. The system can be optimized with regard to the desired criteria in particular through a suitable choice of the parameters "clock frequency CLOCKM of the picture data memory 1", "size of the buffer memories 6 and 8", "number of successive memory access, (page mode cycles)" and "width of the memory bus 5".

What is claimed is:

1. A picture data memory device,
    having a central picture data memory for storing picture data of a plurality of picture data input channels connected to the picture data memory, the picture data memory additionally being connected to a plurality of picture data output channels for reading out and outputting stored picture data for further processing of the output picture data, and
    having memory control means for coordinating the individual storage operations of the picture data input channels and the individual read-out operations of the picture data output channels,
    wherein each picture data input channel and each picture data output channel are assigned a synchronization signal, the individual synchronization signals being fed to the memory control means, and
    wherein the memory control means carry out coordination between the individual storage operations of the picture data input channels and the individual output operations of the picture data output channels taking account of the corresponding synchronization signals.

2. The picture data memory device as claimed in claim 1, wherein the central picture data memory is an SDRAM memory.

3. The picture data memory device as claimed in claim 1, wherein the central picture data memory is an eDRAM memory.

4. The picture data memory device as claimed in claim 1, wherein in the presence of request signals of the individual input and/or output channels for storing and/or for reading out corresponding picture data, the memory control means co-ordinate and process these requests in accordance with a specific priority scheme.

5. The picture data memory device as claimed in claim 4,
    wherein each input channel comprises an input channel buffer memory which, on the input side, receives and buffer-stores the picture data of the corresponding input channel and, on the output side, is connected to the picture data memory, and
    wherein each input channel buffer memory is assigned input channel control means which generate a storage request signal for the memory control means if a specific volume of picture data is stored in the corresponding input channel buffer memory.

6. The picture data memory device as claimed in claim 5,
    wherein each output channel comprises an output channel buffer memory which, on the input side, is connected to the picture data memory and buffer-stores the picture data of the corresponding output channel which are received from the picture data memory, and
    wherein each output channel buffer memory is assigned output channel control means which generate a read-out request signal for the memory control means if the corresponding output channel butler memory has a specific free storage capacity.

7. The picture data memory device as claimed in claim 6,
    wherein the input channel control means are configured in such a way that, in the presence of a corresponding activation signal from the memory control means, they initiate the storage, in the picture data memory, of a volume of picture data stored in the corresponding input channel buffer memory, and
    wherein the output channel control means are configured in such away that, in the presence of a corresponding activation signal from, the memory control means, they initiate the read-out of a specific volume of picture data from the picture data memory and the storage of this volume of picture data in the corresponding output channel buffer memory.

8. The picture data memory device as claimed in claim 7, wherein the capacity of each input channel buffer memory and of each output channel buffer memory is greater than the volume of picture data transferred per storage or read-out operation.

9. The picture data memory device as claimed in claim 6, wherein the input channel buffer memory and the output channel buffer memory are in each case formed by a register chain or an SRAM memory.

10. The picture data memory device as claimed in claim 6, wherein the input channel buffer memory and the output channel buffer memory are connected to the picture data memory via a common bus.

11. The picture data memory device as claimed in claim 4,
wherein the memory control means comprise address generator means for generating channel-specific address signals, and
wherein the memory control means, for each request that is currently to be processed in accordance with the specific priority scheme, generates an activation signal for the corresponding input or output channel for carrying out the corresponding storage or read-out operation and instructs the address generator leans for generating a corresponding address signal for the picture data memory.

12. The picture data memory device as claimed in claim 11,
wherein the address generator means comprise a dedicated address generator for each input and output channel, and
wherein the synchronization signal of the corresponding input or output channel is applied to each address generator, each address generator being set to a specific start address of the picture data memory synchronously with the synchronization signal applied to said address generator.

13. The picture data memory device as claimed in claim 11, wherein the generation of the address signals by the address generator means can be manipulated with the aid of corresponding control signals and/or with the aid of corresponding parameterization.

14. The picture data memory device as claimed in claim 1, wherein each picture data input channel and each picture data output channel are assigned a specific address range in the central picture data memory.

15. The picture data memory device as claimed in claim 1, wherein at least two of the input channels are asynchronous with respect to one another.

16. The picture data memory device as claimed in claim 1, wherein at least two of the output channels are asynchronous with respect to one another.

17. The picture data memory device as claimed in claim 1, wherein at least two input and output channels are asynchronous with respect to one another.

* * * * *